(12) United States Patent
Zhang et al.

(10) Patent No.: US 11,758,216 B2
(45) Date of Patent: Sep. 12, 2023

(54) NON-OCCLUDING VIDEO OVERLAYS

(71) Applicant: Google LLC, Mountain View, CA (US)

(72) Inventors: Wenbo Zhang, Mountain View, CA (US); Alexander Kenny Guo, Cambridge, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/637,355

(22) PCT Filed: Oct. 30, 2020

(86) PCT No.: PCT/US2020/058087
§ 371 (c)(1),
(2) Date: Feb. 22, 2022

(87) PCT Pub. No.: WO2022/093252
PCT Pub. Date: May 5, 2022

(65) Prior Publication Data
US 2022/0368979 A1  Nov. 17, 2022

(51) Int. Cl.
*H04N 21/431* (2011.01)
*G06T 7/73* (2017.01)
(Continued)

(52) U.S. Cl.
CPC .......... *H04N 21/4316* (2013.01); *G06T 7/73* (2017.01); *G06V 20/41* (2022.01); *G06V 20/46* (2022.01);
(Continued)

(58) Field of Classification Search
None
See application file for complete search history.

(56) References Cited

U.S. PATENT DOCUMENTS

| 2014/0359656 A1 | 12/2014 | Banica et al. |
| 2016/0066024 A1 | 3/2016 | Gaziel et al. |
| 2018/0012630 A1 | 1/2018 | Thomee et al. |

FOREIGN PATENT DOCUMENTS

| JP | 2006-041886 | 2/2006 |
| JP | 2009-022010 | 1/2009 |

(Continued)

OTHER PUBLICATIONS

International Search Report and Written Opinion in International Appln. No. PCT/US2020/058087, dated Jul. 27, 2021, 15 pages.
(Continued)

*Primary Examiner* — Samira Monshi
(74) *Attorney, Agent, or Firm* — Fish & Richardson P.C.

(57) ABSTRACT

Methods, systems, and apparatus, including computer programs encoded on a computer storage medium, for overlaying content on video streams. In one aspect, a category of a video is identified. Confidence scores are determined that each indicate a likelihood that a location in a frame includes a feature of a feature type. A weight for each feature type is determined, based on the category, that reflects an importance of not occluding features of the feature type. Confidence scores are adjusted, for each feature type, based on the weight for the feature type, to generate adjusted confidence scores. The adjusted confidence scores are aggregated for each location for each frame to generate aggregated and adjusted confidence scores. A location at which to position overlaid content during video display is determined based on the aggregated and adjusted confidence scores. The overlaid content is provided for display at the determined location in the video.

20 Claims, 7 Drawing Sheets

(51) Int. Cl.
*G06V 20/40* (2022.01)
*H04N 21/44* (2011.01)

(52) U.S. Cl.
CPC .............. *H04N 21/44008* (2013.01); *G06T 2207/10016* (2013.01); *G06T 2207/10024* (2013.01); *G06T 2207/30201* (2013.01)

(56) References Cited

FOREIGN PATENT DOCUMENTS

| | | |
|---|---|---|
| JP | 2012-010117 | 1/2012 |
| JP | 2016-061885 | 4/2016 |
| JP | 2017-510167 | 4/2017 |

OTHER PUBLICATIONS

Office Action in Japanese Appln. No. 2022-512820, dated May 29, 2023, 10 pages (with English translation).
Office Action in Korean Appln. No. 10-2022-7006392, dated May 24, 2023, 21 pages (with English translation).

NON-OCCLUDING VIDEO OVERLAYS

CROSS-REFERENCE TO RELATED APPLICATIONS

This application is a National Stage Application under 35 U.S.C. § 371 and claims the benefit of International Application No. PCT/US2020/058087, filed on Oct. 30, 2020. The disclosure of the prior application is considered part of and is incorporated by reference in the disclosure of this application.

BACKGROUND

This specification generally relates to data processing as well as overlaying content on top of different types of video streams while avoiding areas of the video streams that feature specific types of content.

Videos that are streamed to a user can include additional content that is overlaid on top of the original video stream. The overlaid content may be provided to the user within a rectangular region that overlays and blocks a portion of the original video screen. In some approaches, the region for provision of the overlaid content is positioned at arbitrary locations of the video screen, e.g., the center bottom of the screen. If important content of the original video stream is positioned at the center bottom of the video screen, it can be blocked or obstructed by the overlaid content.

SUMMARY

In general, one innovative aspect of the subject matter described in this specification can be embodied in methods including the operations of: identifying, for a video with which overlaid content is to be displayed, a video category of the video from a set of predefined video categories; for each video frame in a set of sampled video frames of the video: determining, for each video feature type of a set of video features types and for each location of multiple locations in the video frame, a confidence score that indicates a likelihood that the location in the video frame includes a feature of the video feature type; determining, based on the video category, a weight for each video feature type that reflects an importance of not occluding a video feature of the video feature type when a video of the video category is displayed; and adjusting, for each video feature type of the set of video features types, the confidence scores for the multiple locations in the video frame based on the determined weight for the video feature type, to generate adjusted confidence scores; aggregating the adjusted confidence scores for each location for each video frame in the set of sampled video frames to generate aggregated and adjusted confidence scores; determining, based on the aggregated and adjusted confidence scores, a location at which to position overlaid content during video display; and providing the overlaid content for display at the determined location in the video. Other embodiments of this aspect include corresponding methods, apparatus, and computer programs, configured to perform the actions of the methods, encoded on computer storage devices. These and other embodiments can each optionally include one or more of the following features.

In some implementations, the video feature types can include human face, human torso, text, moving object, or change in color variance.

In some implementations, at least some confidence scores for different video feature types can be determined in parallel.

In some implementations, adjusting, for each video feature type of the set of video features types, the confidence scores for the multiple locations in the video frame can include adjusting the confidence scores for locations in the video frame that are within a predefined proximity of a center of the video frame.

In some implementations, determining, based on the aggregated and adjusted confidence scores, the location at which to position overlaid content during video display further can include determining the location at which to position overlaid content during video display based on a specified size of the overlaid content and a duration or number of frames over which the overlaid content is to be provided within the video.

In some implementations, determining the location at which to position overlaid content can include determining a plurality of locations and providing the overlaid content at the determined location comprises providing the overlaid content for display at one of the plurality of locations.

In some implementations, methods can further sampling, by a video processing system and based on a sampling rate, the video to obtain the set of sampled video frames. The sampling rate can be determined based on a processing capability of the video processing system.

Particular embodiments of the subject matter described in this specification can be implemented to realize one or more of the following advantages.

The techniques described in this specification provide resource efficient techniques for display of video content and overlay content displayed with the video content. For example, while a user is viewing a video stream that fills a video screen, the content of importance to the user within that video screen area may not fill the entire area of the video screen. Important content can include video features in which a user likely has a strongest interest. For example, important features, e.g., faces, text, or significant objects such as foreground or moving objects, may occupy only a portion of the video screen area. There is an opportunity, therefore, to display additional content to the user in the form of overlaid content that does not obstruct the portion of the video screen area that contains the important underlying content.

Aspects of the present disclosure provide the advantage of identifying feature-containing locations in the video frames from which to exclude overlaid content, because overlaying content over these locations would block or obscure important content (e.g., content classified as important) that is included in the underlying video stream, which would result in wasted computing resources by delivering video to users when the important content is not perceivable to the users, thereby rendering delivery of the video incomplete or ineffective. In some situations, machine learning engines (such as Bayesian classifiers, optical character recognition systems, or neural networks) can identify important features within the video stream, such as faces or other human portions, text, or other significant objects such as foreground or moving objects. Areas can be identified that encompass these important features; and then the overlaid content can be displayed outside of these identified areas, e.g., at location(s) that have been determined to not have (or at least have a least likelihood of having) an important feature. As a result, the user can receive the overlaid content without obstruction of the important content of the underlying video stream, such that the computing resources required to deliver the video are not wasted. This results in a more efficient video distribution system that prevents computing system resources (e.g., network bandwidth, memory, processor cycles, and limited client device display space) from being wasted through the delivery of videos in which the important content is occluded, or otherwise not perceivable by the user.

The technical solution has the further advantage of improving the efficiency of the screen area in terms of the bandwidth of important content delivered to the viewer. If the user is viewing a video in which, as is typical, the important content of the video occupies only a fraction of the viewing area, the available bandwidth to deliver important content to the viewer is underutilized. By using machine learning systems to identify that fraction of the viewing area that contains the important content of the underlying video stream, aspects of the present disclosure provide for overlaying additional content outside of that fraction of the viewing area, leading to more efficient utilization of the screen area to deliver important content to the viewer. In other words, more content is delivered for the same or similar resource overhead.

In some approaches, the overlaid content includes a box or other icon that the viewer can click to remove the overlaid content, for example, if the overlaid content obstructs important content in the underlying video. A further advantage of the present disclosure is that, because the overlaid content is less likely to obstruct important content in the underlying video, there is less disruption of the viewing experience and a greater likelihood that the viewer will not "click away" the overlaid content that has been displayed.

Additionally, identification of important features to avoid occluding can be further refined and customized based on a category of a video, which can result in improvement in each of the technical advantages described above. For example, different video features may be more important for different video categories. It may be more important to not occlude certain types of video features for some video categories, for example, and identifying most important video features for a category can increase efficiency of content distribution (e.g., by not wasting resources by distributing videos in which important content is occluded). As another example, for some video categories, certain video features may be less important (or not important), and viewing areas that include low or non-important content may be utilized for overlaid content, thus increasing efficient utilization of the screen area to deliver important content to the user.

Moreover, the techniques described in this specification provide various approaches for reducing processing time (and use of resources) for determining locations at which to display overlaid content. For instances, various down sampling and parallelization approaches can be used. Accordingly, identification of appropriate locations at which to display overlaid content can be performed using less computing resources, while still benefitting from the other technical advantages of the invention that occur when overlaid content is displayed at the identified location(s).

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
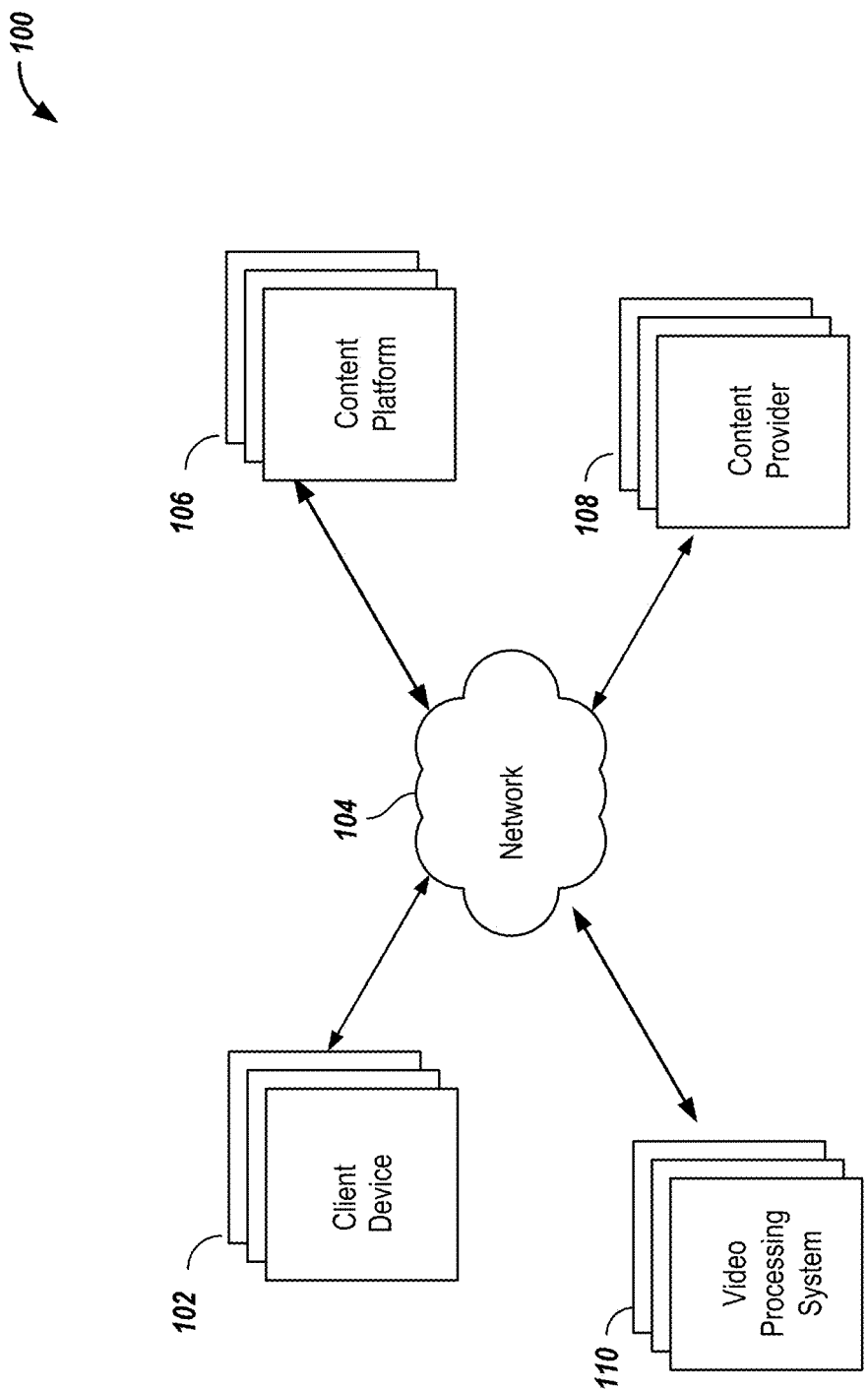
FIG. 1 is a block diagram of an example environment in which digital content is distributed and provided for display on client devices.

This specification generally relates to overlaying content on top of different types of video streams while avoiding areas of the video streams that feature important content.

As summarized below and described in greater detail throughout this document, video systems generally display overlaid content (e.g., text, images, etc.) at a static, predetermined location within a video, such as at a center-bottom portion of the video. However, for some videos (or for some types of videos), displaying overlaid content at a static, predetermined location may occlude important content of the video. For example, sports-related videos may display a scoreboard at the center-bottom portion of the video, and overlaid content displayed at a preconfigured location, e.g., of the center-bottom, may occlude the scoreboard, which may frustrate the user and cause the underlying video content to be of less importance to the user.

The techniques described herein provide a video system that can be configured to identify portions of the video where overlaid content can be provided without occluding important video content. Important content can include, for example, video features such as text, human faces, human torsos, moving objects, or portions of video that undergo color variance changes between video frames. Important content can include types of video features over which displaying overlaid content would be undesirable for a user because a user desires to view the content and finds the content interesting. In some implementations, the video system can be configured to automatically identify, within a set of frames of a video, video features of video feature types corresponding to important content. The video system can automatically determine locations at which to display overlaid content by identifying locations at which video features have not been identified. For example, a confidence score can be determined for each video feature type and for each location of multiple locations in the video frame. Each confidence score can indicate a likelihood that a location in the video frame includes a feature of a particular video feature type. The confidence scores can be aggregated and used to determine a location at which to display overlaid content.

In some implementations, depending on the type or category of the video, certain features of the video may be important in that overlaying content over those features would interfere with the viewing of the video, and other features may be less important in that overlaying content over those features would not interfere with the viewing of the video. The video system can thus be configured to adjust the confidence values for the different features based on the category or type of the video. In some implementations, for different types/categories of videos, the video system can be configured to assign different levels of importance (e.g., a weight on a numerical scale from 1 to 5) to each detected feature type. A high importance/weight for a particular feature type indicates that the particular feature type should not be occluded with overlay content, while a low importance/weight indicates that the particular feature type can be occluded with the overlay content. For example, for a talk show video, a high importance (e.g., a weight of 4 on a scale of 1 to 5) may be assigned for not overlaying portions of the video that include human faces. For a sports-related video, a high importance (e.g., a weight of 4 or 5 on a scale of 1 to 5) may be assigned for not overlaying textual portions of the video (e.g., portions that include the score) and for not overlaying portions of the video where there is motion.

Based on the weights assigned to each feature type, confidence values for various feature types can be adjusted based on video category weights, so that a likelihood of overlaying content over feature types more important for the video category is reduced. Based on the adjusted confidence values for the different feature types, the video system can identify one or more locations at which the overlay content can be displayed. The video system can then provide the overlay content for display at one of these identified locations.

These features and additional features are further described in greater detail below with reference to FIGS. 1-7.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally-identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 in which digital content is distributed and provided for display on client devices. The example environment 100 includes a network 104. The network 104 can include a local area network (LAN), a wide area network (WAN), the Internet, or a combination thereof. The network 104 can also include any type of wired and/or wireless network, satellite networks, cable networks, Wi-Fi networks, mobile communications networks (e.g., 3G, 4G, and so forth), or any combination thereof. The network 104 can utilize communications protocols, including packet-based and/or datagram-based protocols such as internet protocol (IP), transmission control protocol (TCP), user datagram protocol (UDP), or other types of protocols. The network 104 can further include a number of devices that facilitate network communications and/or form a hardware basis for the networks, such as switches, routers, gateways, access points, firewalls, base stations, repeaters or a combination thereof.

The network 104 connects client devices 102, content platforms 106, content providers 108, and video processing systems 110. The example environment 100 can include many different content platforms 106, video processing systems 110, client devices 102, and content providers 108.

A content platform 106 is a computing platform (such as, e.g., a network server or another data processing apparatus described with reference to FIG. 7) that enables distribution of content. Example content platforms 106 include search engines, social media platforms, video sharing platforms, new platforms, data aggregator platforms, or other content sharing platforms. Each content platform 106 may be operated by a content platform service provider.

The content platform 106 can publish and make available its own content. For example, the content platform 106 may be a news platform, which publishes its own news articles. The content platform 106 may also display content provided by one or more content providers 108 that are not part of the content platform 106. In the above example, the news platform may also display third party content provided by one or more content providers 108. As another example, the content platform 106 may be a data aggregator platform that does not publish its own content, but aggregates and displays third party content provided by different content providers 108.

In some implementations, a content platform 106 may store certain information about a client device (e.g., device preference information, content consumption information, etc.). Such user information may be used by the content platform, e.g., to tailor the content that is provided to the client device 102 or to enable ready access to particular content that is frequently accessed by the client device 102. In some implementations, the content platform 106 may not store such device information on the platform; however, the content platform 106 may nevertheless provide such information for storage on a particular server (separate from the content platform). The content platform 106 (also referred to herein as content platform/server 106 or simply server 106) thus refers to a content platform that stores such device information or a server (separate from the content platform) that stores such device information.

In some implementations, the content platform 106 is a video service through which users can view streamed video content. Videos that are streamed to a user can include additional content (e.g., provided by a content provider 108) that is overlaid on top of the original video stream. It can be generally desirable to provide overlaid content on an underlying video stream, to provide additional content to a viewer of the video stream and to improve the quantity of content delivered within the viewing area for a given video streaming bandwidth. In addition or alternatively to video streaming scenarios, the content platform 106 can include a video processor that processes a video file, to modify the video file to include overlaid content, with the processed video file with the overlaid content being provided to the client device 102 for display on the client device 102.

However, there is a technical problem of determining how to place the overlaid content so that it does not occlude important content in the underlying video. This is a particularly difficult problem in the context of overlaying content on video because the locations of important content in a video can change quickly over time. As such, even if a particular location within the video is a good candidate for overlay content at one point in time (e.g., in one frame), that location may be a bad candidate for overlay content at a later point in time/in subsequent frames (e.g., due to movement of characters within the video).

Using location information of important content determined by the video processing system 110, the content platform 106 can overlay content on top of a video stream, while at the same time avoiding areas of the video screen that feature important content in the underlying video stream, e.g., areas in the original video stream that contain faces, text, or significant objects such as moving objects. The video processing system 110 can, for example, include machine learning methods and engines that can identify locations in the video that are less likely to include important content, so that overlaid content displayed at those locations is less likely to obstruct important content in the underlying video. As described in more detail below, different types (e.g., categories) of videos can include different types of important content. Accordingly, the video processing system 110 can prioritize selection of locations for overlaid content based on avoiding video features that are particularly important for a video category that has been determined for the video.

Additional structural and operational aspects of these components of the example environment 100 are described with reference to FIG. 3.

Figure 2:
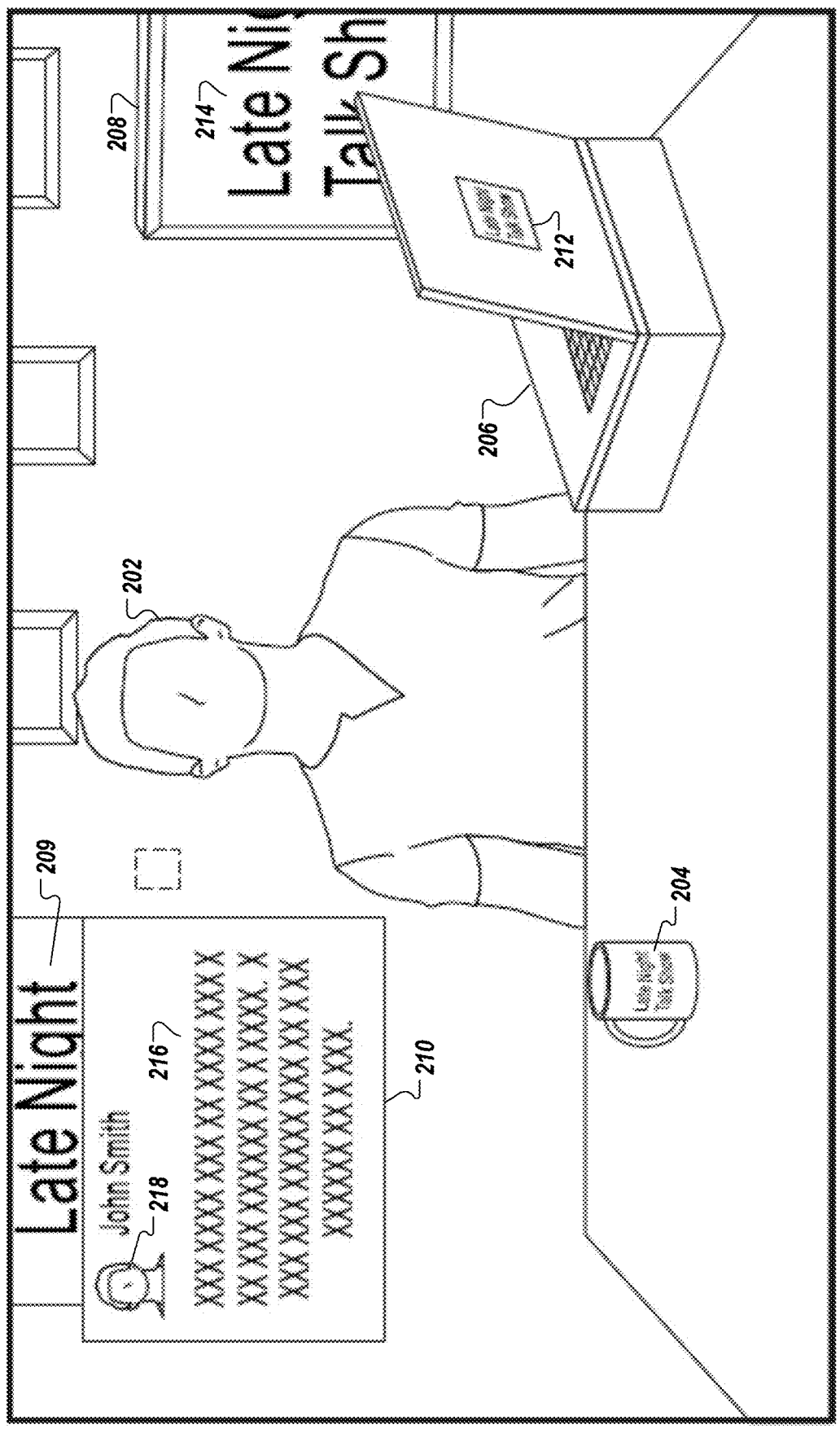
FIG. 2 illustrates an example video frame.

FIG. 2 illustrates an example video frame 200. The video frame 200 includes various features, such as a person 202 and various objects (e.g., a cup 204, a laptop 206, a sign 208, a text label 209, and a social media post 210). Other than the text label 209, some of the other objects included in the video frame 200 can include other text. For example, the cup 204 has a text label, the laptop 206 has a sticker 212 that includes text, the sign 208 includes text 214, and the social media post 210 includes text 216.

When overlaid content is displayed on top of the video frame 200, it can be desirable to not occlude important features shown in the frame 200. Some features may be more important to a user than other features. In some cases, feature size may determine importance. For example, a face of the person 202 may be more important than a face 218 in the social media post based on the face of the person 202 being larger than the face 218. As another example, the face of the person 202 may be more important than the face 218 due to movement of the person 202 during the video.

As another example, feature importance may be based on a category of the video. As described below with respect to FIG. 3, a category of the video can be determined. For instance, the video frame 200 can be a frame from a talk show video and the video can have a talk show or entertainment category. The person 202 may be a talk show host, for example.

For talk show videos, certain types of features, such as human faces or torsos, may be particularly important. Other types of features, such as text, may also be important but not as important as human features. Talk show videos may place different types of importance on certain features than for other video categories. For example, for a sports video, static text, such as a scoreboard, and moving objects (e.g., players) may have highest importance. Small text items, such as ball, strike, and out counts, may be deemed important in a sports (e.g., baseball) video, whereas, small text items such as the text on the cup 204 may not be deemed particularly important for the talk show video (although larger text items, such as the text 214 on the sign 208 or the text 216 in the social media post 210 may still have significant importance).

As described in more detail below, the video processing system 110 can determine, based on a video category (e.g., talk show) of the video that includes the video frame 200, and based on detected locations of features that are important for the video category, one or more locations at which to display overlay content in the video so as to not occlude features that are important for the video category.

Figure 3:
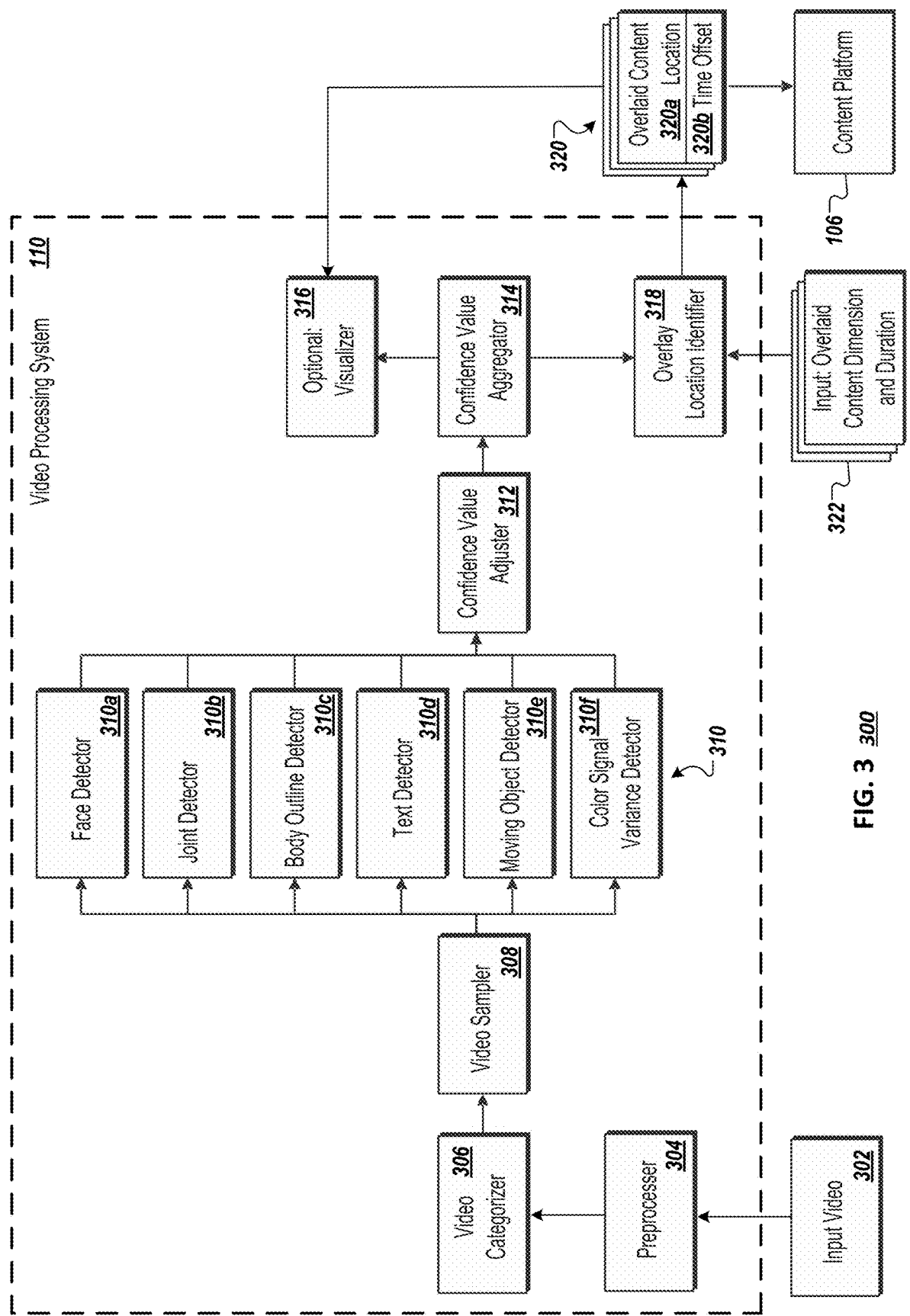
FIG. 3 is a block diagram of an example environment in which a video processing system determines a location within a video at which to overlay content.

FIG. 3 is a block diagram of an example environment 300 in which the video processing system 110 determines a location within a video at which to overlay content. The video processing system 110 can receive or access an input video 302. For example, the video processing system 110 can receive a video file or stream or a link to a video file or stream. In some implementations, the video processing system 110 can process multiple video inputs in parallel (and produce respective outputs for each video input).

In some implementations, the video processing system 110 includes a preprocessor 304. The preprocessor 304 can, for example, preprocess the input video 302 to provide a uniformity of one or more of frame rate, video size, video quality, video resolution, or video format. The output of the preprocessor 304 can be a video stream in a standard format for further processing by other sub-engines of the video processing system 110.

A video categorizer 306 can identify a category of the input video 302 from a set of predefined video categories. Video categories can include entertainment, gaming, lifestyle, sports, knowledge, and society, to name a few examples. The video categorizer 306 can determine the category of the input video 302 based, for example, on metadata for the input video 302. Metadata can include a video title or may include a video category or genre. A category or genre included in the video metadata can be mapped to one of the predefined video categories. The metadata 302 can be received with the input video 302 or may be accessed by the video categorizer 302 as part of video categorization. In some implementations, a video category is provided as input to the video processing system 110 (e.g., along with the input video 302). Other types of video categorization can be performed, such as techniques that involve analyzing a subset of the frames of the input video 302 and determining the video category based on content of the analyzed frames.

A video sampler 308 can capture a subset of frames of the input video 302. For example, the video sampler 308 can determine a sampling rate, which can be, for example, a number of frames per second or a number of seconds per frame. For instance, the video sampler 308 can capture three frames per second, one frame per second, or one frame every three seconds. A sampling rate can be determined based on a variety of factors. In some cases, a sampling rate can be determined based on the video category. For example, some types of video content may be more dynamic (e.g., as far as changing of content between frames) than other types of content that are more static. For example, prior analysis may show that entertainment videos may be generally more dynamic than knowledge videos. Accordingly, a sampling rate for an entertainment video may be higher than for a knowledge video.

In some cases, a sampling rate can be determined based on processing capabilities of the video processing system 110. A particular instance of the video processing system 110 that receives a given input video 302 may have a preconfigured processing capability, for example. As another example, processing capability can be dynamically determined, such as based on current (or recent) resource utilization. Recent resource utilization may be based on recent processing of other input videos by the video processing system 110, for example. In some implementations, the sampling rate can be a parameter that can be configured by an administrator. Lowering a sampling rate can result in resource efficiency, by reducing a number of frames that are processed.

The sampled frames can be processed by a set of feature detectors 310. The feature detectors 310 include a face detector 310a, a human joint detector 310b, a body outline detector 310c, a text detector 310d, a moving object detector 310e, and a color signal variance detector 310f. In some implementations, the feature detectors 310 are executed at least partially in parallel. Separate tasks can be initiated for each feature type, for example, with a master task performing coordination and monitoring of parallel tasks. Some or all feature detectors 310 may perform certain optimizations that are specific to the given feature detector 310. For example, frame images can be downsampled (e.g., lower resolution) for some (or all) types of feature detection.

Each feature detector 310 can determine a confidence score for each location of each sampled frame, with a given confidence score indicating a confidence that a given location in a given frame includes a feature corresponding to the given feature detector 310. Confidence scores can range from zero to one, for example, with zero indicating lowest confidence of feature detection and one indicating strongest confidence of feature detection.

In some approaches, detected features may be discriminated by limiting feature detection to larger features, i.e. features that are in the foreground and closer to the point of view of the video, as opposed to background features. For example, larger human faces corresponding to persons in the foreground of a video may be detected by the face detector 310a, while smaller human faces corresponding to persons in the background of a video, such as faces in a crowd, may be excluded from detection by the face detector 310a or may receive a lower confidence score than larger faces.

Confidence scores can be stored in a confidence score map or matrix. Matrix dimensions and addressing can correspond to dimensions and locations of a video frame, for example. A location can correspond to a single pixel or a block of multiple pixels, for example. For instance, a location can be a 10×10 block of pixels. A block size can be a configurable or dynamically-determined parameter. A larger or smaller block size may be configured, based, for example, on processing capabilities or desired accuracy or processing time. Processing capabilities can be determined based on preconfigured resource descriptions or based on dynamic performance, as mentioned above. Higher processing capability or a higher level of desired accuracy can result in a smaller block size, for instance. Lower processing capability or a smaller desired processing time can result in a larger block size, for example.

The face detector 310 can be configured to detect human faces in the sampled frames. The face detector 310a can detect blurred faces, side-profiles, and faces with closed eyes. The face detector 310a can create a confidence map for each sampled frame, with a confidence score of non-zero for areas inside of detected faces (with the non-zero confidence score being higher for higher confidence of a detected face) and a zero confidence score for areas of the frame outside of detected faces. The face detector 310a can be or include a computer vision system such as a machine learning system, e.g., a Bayesian image classifier or convolutional neural network (CNN) image classifier. For purposes of efficiency, the face detector 310a may find frame locations in which human faces appear in the frame without actually recognizing the identities of persons that are displayed within those locations (e.g. recognizing the faces of specific persons that are displayed within those regions).

The human joint detector 310b, which can be or include a machine learning computer vision engine, can detect other important human body parts, such as a neck, shoulders, elbows, wrists, or hands. In some implementations, certain body parts, such as those of the upper body, can be treated more importantly than, e.g., lower body parts. In some cases, the human joint detector 310b is configured to weight upper body parts more importantly whereas in other implementations, the human joint detector 310b can exclude lower body parts from detection. Once a joint is detected, an area around the joint (e.g., a circle) can be identified, and the area within the circle can be treated as a location that includes an important human body part. The size of the circle can be based on a detected size of the human to which the joint belongs (e.g., larger people in the frame can have larger circle areas around detected joints). The size of the circle (or a person-size to circle-size ratio) can be a configurable parameter. Different joints can have different-sized circles as compared to other types of joints. For example, a shoulder joint may be deemed more important than an elbow joint, so a larger circle can be used for a shoulder than an elbow (or as another example, the shoulder joint may be represented by a larger circle due to generally being a larger joint than an elbow joint). The joint detector 310b can create a confidence map for each sampled frame, with a confidence score of non-zero for areas inside of joint-related circles (with the non-zero confidence score being higher for higher confidence of a detected joint) and a zero confidence score for areas of the frame outside of joint-related circles.

The body outline detector 310c can determine outlines of detected people in sampled frames. The body outline detector 310c can be or include a CNN. In some implementations, the body outline detector 310c can be used in addition to the face detector 310a and the human joint detector 310b to identify any area of a frame occupied by a human body, not just an important human body part such as a face or important joint. In some implementations, the body outline detector 310c generates a confidence map but includes scores that are weighted less then high-confidence scores generated by the face detector 310a or the human joint detector 310b. For instance, the face detector 310a may score a location with a detected face with a confidence score of one for high confidence of a detected face, the human joint detector 310b may score a location with a detected joint with a confidence score of 0.8 for high confidence of a detected joint, and the body outline detector 310c may score locations within a body outline with a confidence score of 0.6. A net result of varying weight of scores between the face detector 310a, the human joint detector 310b, and the body outline detector 310c can be that avoiding occlusion of important body parts is treated according to body part priority, with faces treated most critically and important joints treated more critically than body portions outside of faces and important joints. Ultimately, whether overlaid content is placed over a given frame location is based on aggregated (and adjusted) confidence scores that are aggregated across feature detectors 310, as described in more detail below.

The text detector 310d can detect text in sampled frames, so as to avoid occluding important textual content, such as subtitles, game scores, or headings. The text detector 310d can detect textual features within a video frame, such as text that appears on product labels, road signs, white boards on screen within a video of a school lecture, etc. The text detector 310d can detect text in multiple languages and can recognize text of various sizes or text that is distorted. Of note, textual features detected within a frame are part of the video stream itself, in contrast to overlaid content which is separate from the video stream.

The text detector 310d can be or include a machine learning system such as an optical character recognition (OCR) system. For purposes of efficiency, the text detector 310d may find frame locations in which text appears without actually recognizing the values of the text that is displayed within those locations. The text detector 310d can create a confidence map for each sampled frame, with a confidence score of non-zero for locations that include text (with the non-zero confidence score being higher for higher confidence of detected text) and a zero confidence score for areas of the frame outside areas that include text. In some implementations, a padding area (e.g., twenty pixels) is added to locations that include text as a transition gradient, with the padding area being treated as part of the textual area.

Other types of important features that a user may prefer to not be occluded can be moving objects. For example, objects that are in motion are generally more likely to convey important content to the viewer than static objects and are therefore generally less suitable to be occluded by overlaid content. The moving object detector 310e can detect moving objects by detecting movement between adjacent sampled frames, based on color-space differences between frames. Processing can be performed for each frame (other than first and last frames) using a previous, current, and next frame (with calculations producing a confidence score for the current frame). Moving object detection can include calculating a mean color value of pixels within a frame location (e.g., when a location corresponds to multiple pixels), and calculating an Euclidean difference between the mean color value for that location with mean color values calculated for corresponding locations in previous and next frames. A higher difference value can correspond to a higher confidence score that indicates a likelihood that the location corresponds to moving (and thus important) content. Moving object detection can be based on the equation below:

$$M(x, y, t) = \frac{|M_0[x, y, t) - M_0(x, y, t-1)| + |M_0[x, y, t) - M_0(x, y, t+1)|}{Q}$$

where $$M_0(x, y, t) = \text{mean}\left(\sum_{\forall i,j \in S} A_t[i, j, C]\right)$$

where S=all integer pairs i, j∈ |x:x+10), |y:y+10)
where $A_t$=the RGB matrix representing the frame at time t
where $|M_0[x, y, t_0] - M_0[x, y, t_1]|$=the RGB Euclidian distance between two 3×1 vectors
where $Q=2*\sqrt{3*256^2}$, the largest possible Euclidian distance
and where i, j, C=a color value C at a coordinate i, j.

Color variance can be another type of feature. Color variance between frames for a location can indicate important content, such as foreground content. Low or no color variance between frames can indicate less important content, such as background areas (e.g., a wall, sky, etc.) The color signal variance detector 310f can determine color variance between frames, and compute a confidence score for each location in each respective frame that indicates whether the location is subject to color variance for the frame in relation to preceding and subsequent frame(s). A location with respect to color variance location can be a block of pixels, as described above. Color variance can be computed according to the formula below:

$$V[x, y, t] = \text{mean}\left(\sum_{C \in \{R,G,B\}} \sum_{\forall i,j \in S} \text{std}(A_t[i, j, C])\right)$$

where S=all integer pairs i, j∈ [x, x+50), [y, y+50)
where $A_t$=the RGB matrix representing the frame at time t A confidence value adjuster 312 can adjust confidence values generated by the feature detectors 310 based on the video category determined by the video categorizer 306. The confidence value adjuster 312 can identify or determine a weight for each feature type, based on the video category. As mentioned, some feature types are more important for some video categories. Each feature type weight for a category can be, for example, a value between zero and one. A weight value of one can indicate the feature type is important for the video category. A weight value of less than one (e.g., 0.5) for a feature type for a video category can indicate that the feature type is less important for the video category. For instance, for talk show videos, a weight for a human face feature may be one, and a weight for a text feature may be 0.8. A sports video category may have a weight of one for moving object features, a weight of one for text features (e.g., for scoreboards or statistics), and a weight of 0.8 for human face features. In some implementations, the confidence value adjuster 312 uses a lookup table to retrieve weights for a given category. The lookup table can store, for each category, a weight value for each of various features. The lookup table can include weight values that are preconfigured by an administrator or the lookup table can include weight values that are dynamically determined or adjusted by a machine learning system that is trained to determine weight adjustments for different video categories A confidence value aggregator 314 can aggregate adjusted confidence scores that have been adjusted by the confidence value adjuster 312 to produce aggregated and adjusted confidence scores for each location for each sampled frame. Aggregated and adjusted confidence scores can be stored in a matrix for each sampled frame. Aggregation can include, for each location and for each sampled frame, summing the confidence values computed for the location by each feature detector 310. If a sum is more than one for a location of a sampled frame, the confidence value aggregator 314 can cap the sum at one. Accordingly, aggregated and adjusted confidence scores can have a value between zero and one, with a value of one indicating highest confidence of an important feature at a location and zero indicating a lowest confidence of an important feature at the location.

The confidence value aggregator 314 (or in some implementations, the confidence value adjuster 312) can further adjust confidence scores to boost confidence scores of locations located at or near the center of a frame. Center-based adjustments can be made so as to make it less likely that a center location is chosen for overlaid content, based on a general understanding that important content of a video is likely to occupy a center area of a frame (and overlaid content placed at the center may cause too much distraction for a user away from the main content of the video). For instance, a constant two-dimensional Gaussian distribution can be applied as a multiplier to the aggregated and adjusted confidence scores, e.g., according to the formula below:

$$G[x,y]=e^{-(d_{xy}-\mu)^2/2\sigma^2}$$

where $d_{xy}=\sqrt{x^2+y^2}$
where x, y∈ [−width, width), [−height, height)

The aggregated and adjusted confidence scores can be used for various purposes. For example, in some implementations and as illustrated below with respect to FIG. 4, a visualizer 316 can generate and render a heat map for each of one or more sampled frames. A heat map for a frame can display confidence values rendered as different colors. For instance, red colors can indicate high confidence values and green colors can indicate low confidence values. As another example, the heat map for a frame can be combined with (e.g., overlaid onto) the frame image and rendered as a merged image, as shown below with respect to FIG. 5. A standalone and/or overlaid heat map may be viewed by an administrator or developer for, e.g., monitoring, troubleshooting, or debugging purposes.

As another example, in some implementations, the aggregated and adjusted confidence scores can be used to calculate a quality score for one or more existing (e.g., in-use) content slots currently used to display overlay content on the input video 302. A determination can be made as to whether to continue to display overlay content in the existing content slots, based on the calculated quality scores of the existing content slots (e.g., a higher quality score may indicate that the existing content slot is good for displaying the overlay content, while a lower quality score may indicate that the existing content slot is not ideal for displaying the overlay content).

The aggregated and adjusted confidence scores can be used by an overlay location identifier 318 to determine one or more outputs 320 that each include a recommended overlaid content location 320*a* and corresponding time offset 320*b* for the input video 302, based, for example, on one or more of overlaid content and dimension inputs 322 that are received as input. Each overlaid content and dimension input 322 can specify a desired size and display duration for an overlaid content item that is to be overlaid on top of the input video 302 for the specified display duration.

Detected features (as represented by aggregated and adjusted confidence scores) may be situated at different locations within different frames that occupy a certain duration of the input video 302. An overlaid content location 320*a* can be determined so overlaid content that is displayed starting at a time offset 320*b* and for a specified duration of time that includes multiple frames is not positioned anywhere that the detected features are situated across the multiple frames. An identified overlaid content location 320*a* can be a location generally or substantially outside locations that include the identified features in a sequence of video frames corresponding to the input duration. Locations that include identified features can be locations that should not (if possible) be occluded by overlaid content (e.g., to ensure that important content of the underlying input video 302 is not occluded). As another example, an overlaid content location 320*a* can be a location which corresponds to confidence scores that are below a predetermined threshold.

The overlay location identifier 318 can, for a given overlaid content item size and duration, determine candidate overlaid content slots (e.g., based on the content item size and the duration of the content item, which corresponds to a particular number of sequential/consecutive video frames in the input video 302). The overlay location identifier 318 can determine, for each of different series of consecutive frames that correspond to the desired duration, a quality score for each candidate slot for each frame in the series. The quality score for a candidate slot for a frame can be the sum of the aggregated and adjusted confidence scores for all locations located within the candidate slot. An overall quality score can be computed for a candidate slot for a series by computing a sum of all quality scores for the candidate slot for all of the frames in the series. The series can be identified by a time offset of a first frame of the series. A set of one or more highest-ranked overall quality scores can be identified.

Based on the one or more highest-ranked overall quality scores, the overlay location identifier 318 can identify one or more outputs 320, with each output 320 including an overlaid content location 320*a* (e.g., location and size) of a candidate slot having one of the highest-ranked quality scores and a corresponding time offset 320*b* that indicates a starting time offset at which to being display of the overlaid content item.

The output(s) 320 can be provided, for example, to the content platform 106, to enable the content platform 106 to display overlaid content item(s) corresponding to the output(s), at the recommended overlaid content location(s) 320*a*, beginning at corresponding time offset(s) 320*b* during playback of the input video 302. As another example, such as during development or troubleshooting, the output(s) 320 can be provided to the visualizer 316, and the visualizer 316 can render, for example, overlaid content outlines (or in some cases actual overlaid content), for monitoring or troubleshooting purposes, e.g., for viewing by an administrator or developer.

Figure 4:
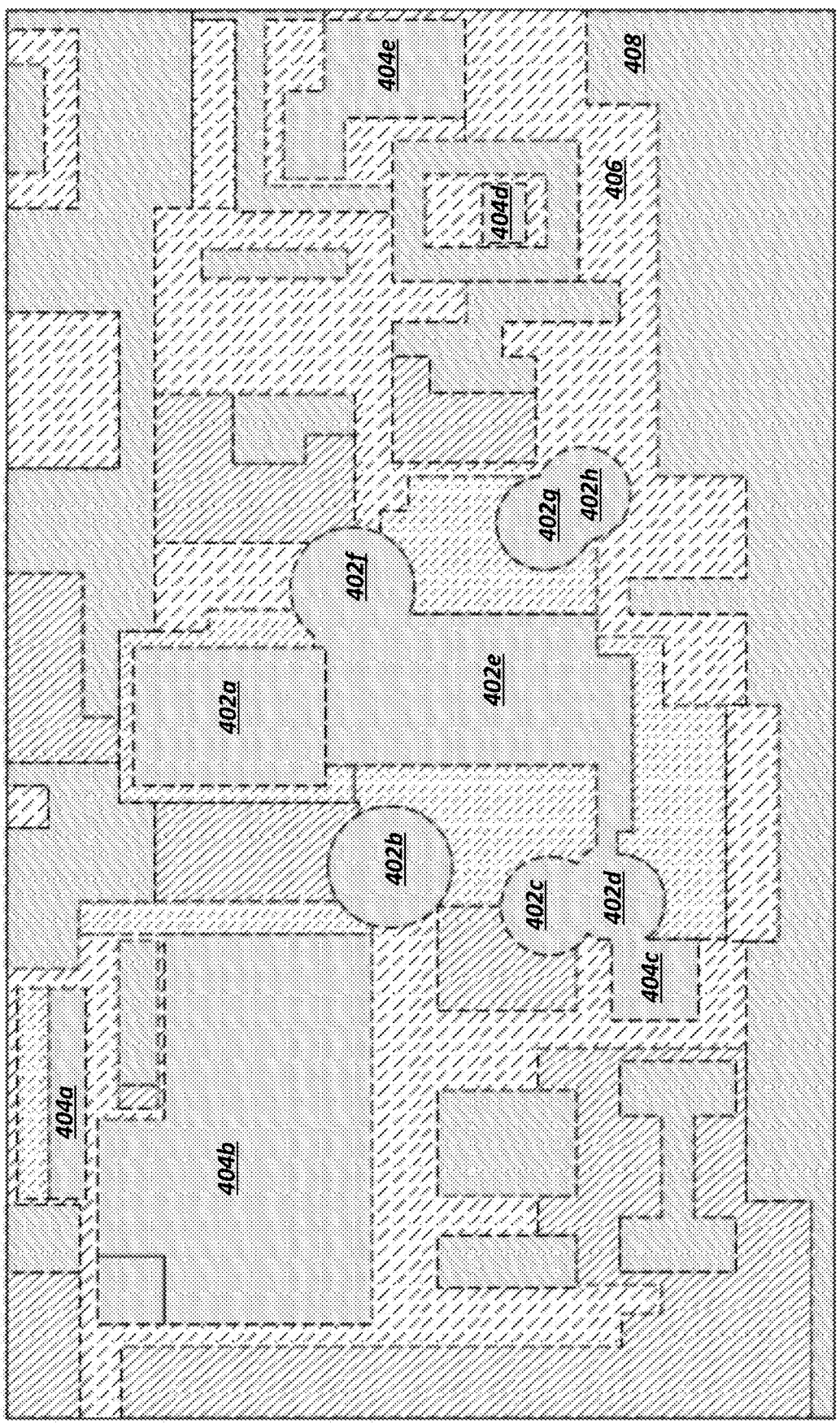
FIG. 4 illustrates an example heat map.

FIG. 4 illustrates an example heat map 400. The heat map 400, which can be generated by the visualizer 316 of FIG. 3, can be used to visualize the aggregated and adjusted confidence scores generated by the confidence value aggregator 314. The heat map 400 can be used by an administrator or developer, for troubleshooting or informative purposes, for example. The heat map 400 is a visualization of a matrix of aggregated and adjusted confidence scores for each sampled video frame 200 described above with respect to FIG. 2.

Different colors can be used to show different confidence levels. For instance, red colors can indicate high confidence values and green colors can indicate low confidence values. Areas 402*a*-402*f* of the heat map 400, which may be colored in red, correspond to high aggregated and adjusted confidence scores that are based on confidence scores generated by the face detector 310*a*, the human joint detector 310*b*, and/or the body outline detector 310*c*. The areas 402*a*-402*f* may have a red color (e.g., corresponding to a high confidence score) based on an adjustment/weighting performed by the confidence value adjuster 312 according to a talk show video category determined by the video categorizer 306. Areas 404*a*-404*e* of the heat map 400 may also be colored in red (e.g., in a same or lighter shade(s) of red) based on (relatively) high aggregated and adjusted confidence scores corresponding to detection of text on the text label 209, the social media post 210, the cup 204, the sticker 212, and the sign 208 by the text detector 310*d*. Other areas of the heat map 400, such as an area 406 and an area 408, may be colored in (e.g., shades of) green, to reflect lower aggregated and adjusted confidence scores. As described above and illustrated in FIG. 5, the overlay location identifier 318 can determine location(s) that correspond to low confidence scores that persist across a set of frames, for a location for display of overlay content for a set of frames equaling a desired duration.

Figure 5:
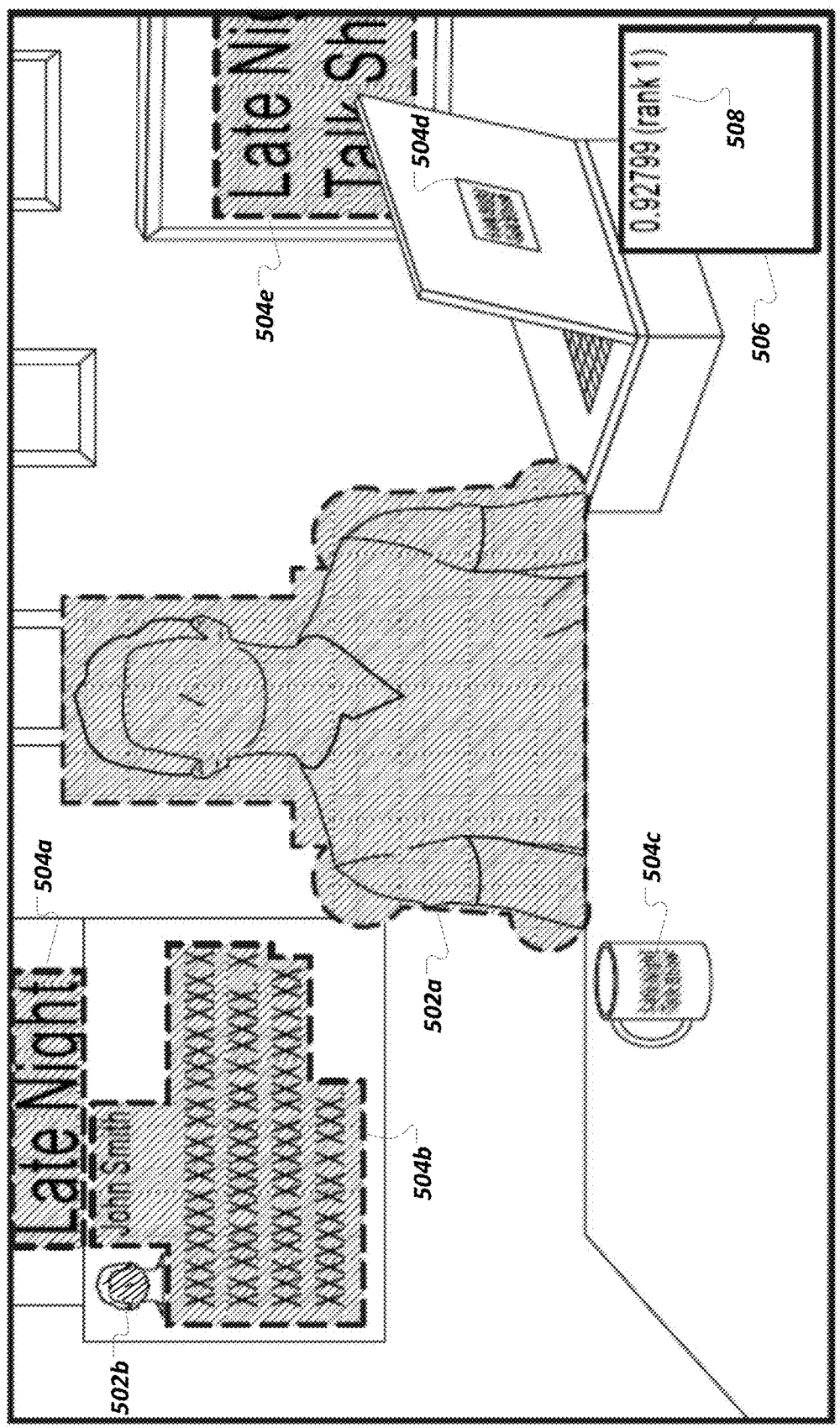
FIG. 5 illustrates an example confidence score visualization.

FIG. 5 illustrates an example confidence score visualization 500. The confidence score visualization 500 illustrates a rendering of at least a portion of the heat map 400 of FIG. 4 over the video frame 200 of FIG. 2. As with the heat map 400, the confidence score visualization 500 can be optionally generated (e.g., by the visualizer 316 of FIG. 3) for troubleshooting, monitoring, or other informative purposes. The visualization 500 includes a colored area 502*a* corresponding to features of the person 202 that have been identified by the face detector 310*a*, the human joint detector 310*b*, and/or the body outline detector 310*c*, for example. A colored area 502*b* corresponds to detection of the face 202 in the social media text 210. Shaded text areas 504*a*-504*e* correspond to detection by the text detector 310*d* of the text label 209, text 216 on the social media post 210, text on the cup 204, text on the sticker 212, and the text 214 on the sign 208. Other colored areas can be shown, or colored areas corresponding to confidence scores above a predetermined threshold can be shown (e.g., to show only areas with highest confidence scores).

A content slot 506, which is located outside of colored areas corresponding to high confidence scores, corresponds to a recommended location for display of an overlaid content item for a specified duration starting at (or at least including) a time offset of the talk show video corresponding to the video frame 200. The content slot 506 can have a size equal to a desired overlaid content size. For informative purposes, a quality score 508 for the content slot 506 is displayed, which can correspond to a highest ranked quality score for the frame 200 determined by the overlay location identifier 318. As mentioned, location information that describes the location of the content slot 506, and a time offset corresponding to the frame 200, can be provided to the content platform 106, for display of an overlaid content item at the location, e.g., when an end user selects to view the talk show video.

Although a single frame and single content slot visualization are shown, multiple frame visualizations (e.g., as a collection of still images or as a modified video stream) can be generated and displayed, e.g., by the visualizer 216, to an administrator, developer, or content manager. Additionally, each frame visualization can include rendering of more than one candidate content slot, such as a top N ranked content slots identified for the current frame.

Figure 6:
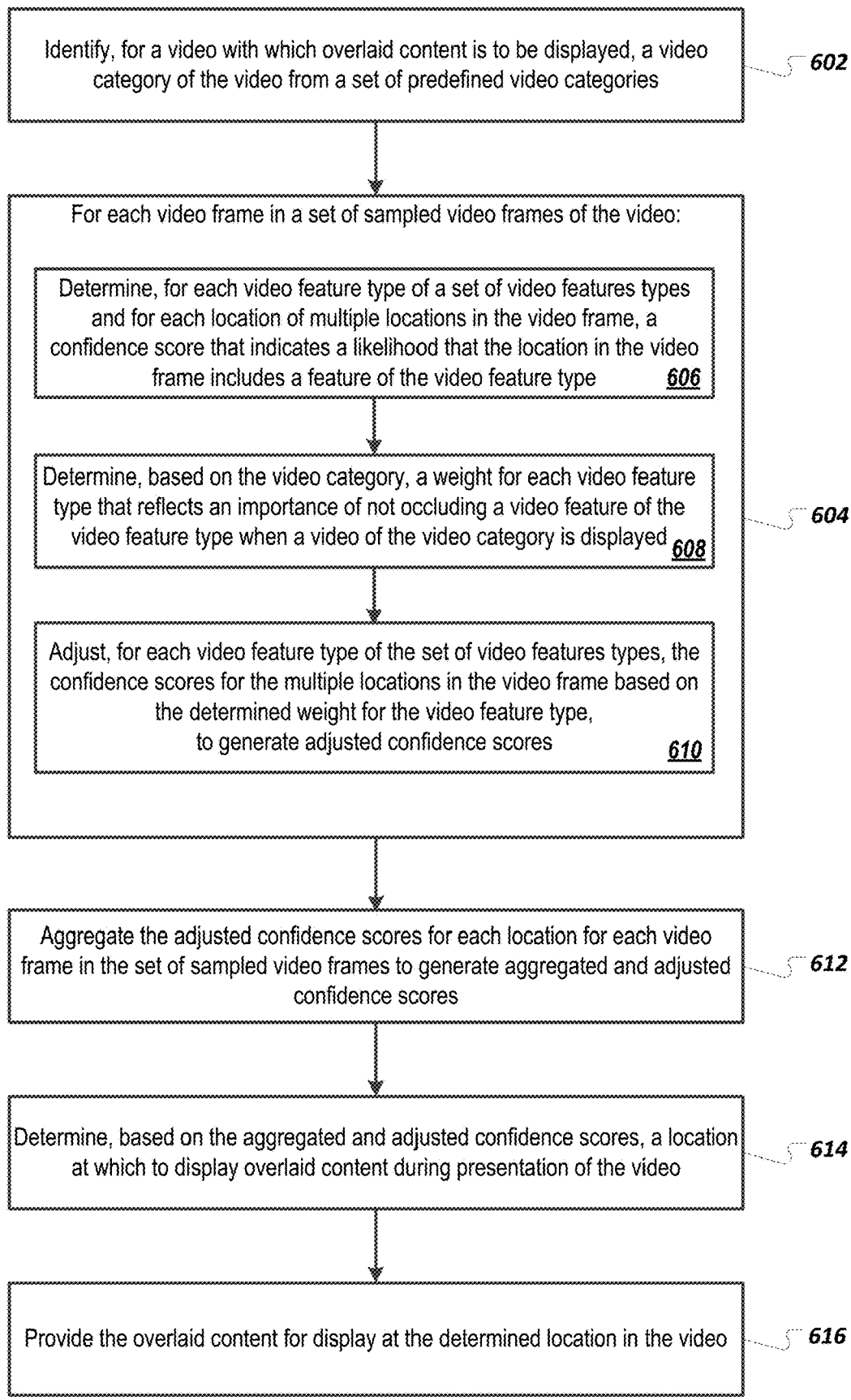
FIG. 6 is a flow diagram of an example process for determining a location within a video at which to display overlaid content.

FIG. 6 is a flow diagram of an example process 600 for determining a location within a video at which to display overlaid content. Operations of the process 600 are described below as being performed by the components of the system described and depicted in FIGS. 1 and 3. Operations of the process 600 are described below for illustration purposes only. Operations of the process 600 can be performed by any appropriate device or system, e.g., any appropriate data processing apparatus. Operations of the process 600 can also be implemented as instructions stored on a computer readable medium which may be non-transitory. Execution of the instructions causes one or more data processing apparatus to perform operations of the process 600.

The video processing system 110 identifies, for a video with which (e.g., over which) overlaid content is to be displayed, a video category of the video from a set of predefined video categories (at 602). For instance, as described above with reference to FIG. 3, the video categorizer 306 can identify a video category for the input video 302. Video categories can include entertainment, gaming, lifestyle, sports, knowledge, and society, among other categories.

The video processing system 110 performs processing for each video frame in a set of sampled video frames of the video (at 604). For example, the video processing system 110 determines, for each video feature type of a set of video features types and for each location of multiple locations in the video frame, a confidence score that indicates a likelihood that the location in the video frame includes a feature of the video feature type (at 606). Video feature types can include human face, human torso, text, moving object, or change in color variance. For instance, as described above with reference to FIG. 3, each of the feature detectors 310, including the face detector 310a, the human joint detector 310b, the body outline detector 310c, the text detector 310d, the moving object detector 310e, and the color signal variance detector 310f can determine a confidence score for each location for each frame. A location within a frame can be a pixel or a block of pixels. At least some confidence scores for different video feature types can be determined in parallel. For instance, two or more of the feature detectors 310 can run in parallel.

The video processing system 110 determines, based on the video category, a weight for each video feature type that reflects an importance of not occluding a video feature of the video feature type when a video of the video category is displayed (at 608). For instance, as described above with reference to FIG. 3, the confidence value adjuster 312 can determine a weight for each feature type of the features associated with the feature detectors 310, based on the video category determined by the video categorizer 306.

The video processing system 110 adjusts, for each video feature type of the set of video features types, the confidence scores for the multiple locations in the video frame based on the determined weight for the video feature type, to generate adjusted confidence scores (at 610). For instance, as described above with reference to FIG. 3, the confidence value adjuster 312 adjusts the confidence scores determined by the feature detectors 310, based on the corresponding weights of the video feature types determined based on the video category determined by the video categorizer 306. In some implementations, confidence scores for locations in the video frame that are within a predefined proximity of a center of the video frame can be further adjusted (e.g., boosted) so as to prevent overlaid content from being positioned at or near the center of a frame.

The video processing system 110 aggregates the adjusted confidence scores for each location for each video frame in the set of sampled video frames to generate aggregated and adjusted confidence scores (at 612). For instance, as described above with reference to FIG. 3, the confidence value aggregator 314 aggregates adjusted confidence scores produced by the confidence score adjuster 312 to generate aggregated and adjusted confidence scores.

The video processing system 110 determines, based on the aggregated and adjusted confidence scores, a location at which to display overlaid content during display of the video (at 614). For instance, as described above with reference to FIG. 3, the overlay location identifier 312 can determine, based on a size of the overlaid content and a desired display duration, an overlaid content location 320a and a time offset 320b of the input video 302 at which to begin display of the overlaid content as an overlay on top of the input video 302. Determining the location at which to display overlaid content during display of the video can include determining the location based on a specified size of the overlaid content and a duration or number of frames over which the overlaid content is to be provided within the video. For instance, with respect to FIG. 3, the overlay location identifier can determine an overlay location based on the overlaid content dimension and duration input 322.

The video processing system 110 provides the overlaid content for display at the determined location in the video (at 616). For instance, as described above with reference to FIG. 3, the video processing system 110 can provide an overlaid content location 320a and a corresponding time offset 320b for an overlaid content item (and in some implementations, the overlaid content item itself) to the content platform 106, for the content platform 106 to render the overlaid content item, at the overlaid content location 320a, starting at the time offset 320b, as an overlay on the input video 302.

Thus, in this manner, the video processing system 110 and/or the content platform 106 can display an overlaid content item on top of video content without occluding important video content, and importantly avoiding content that is most important for videos of a video category determined for the video content.

Figure 7:
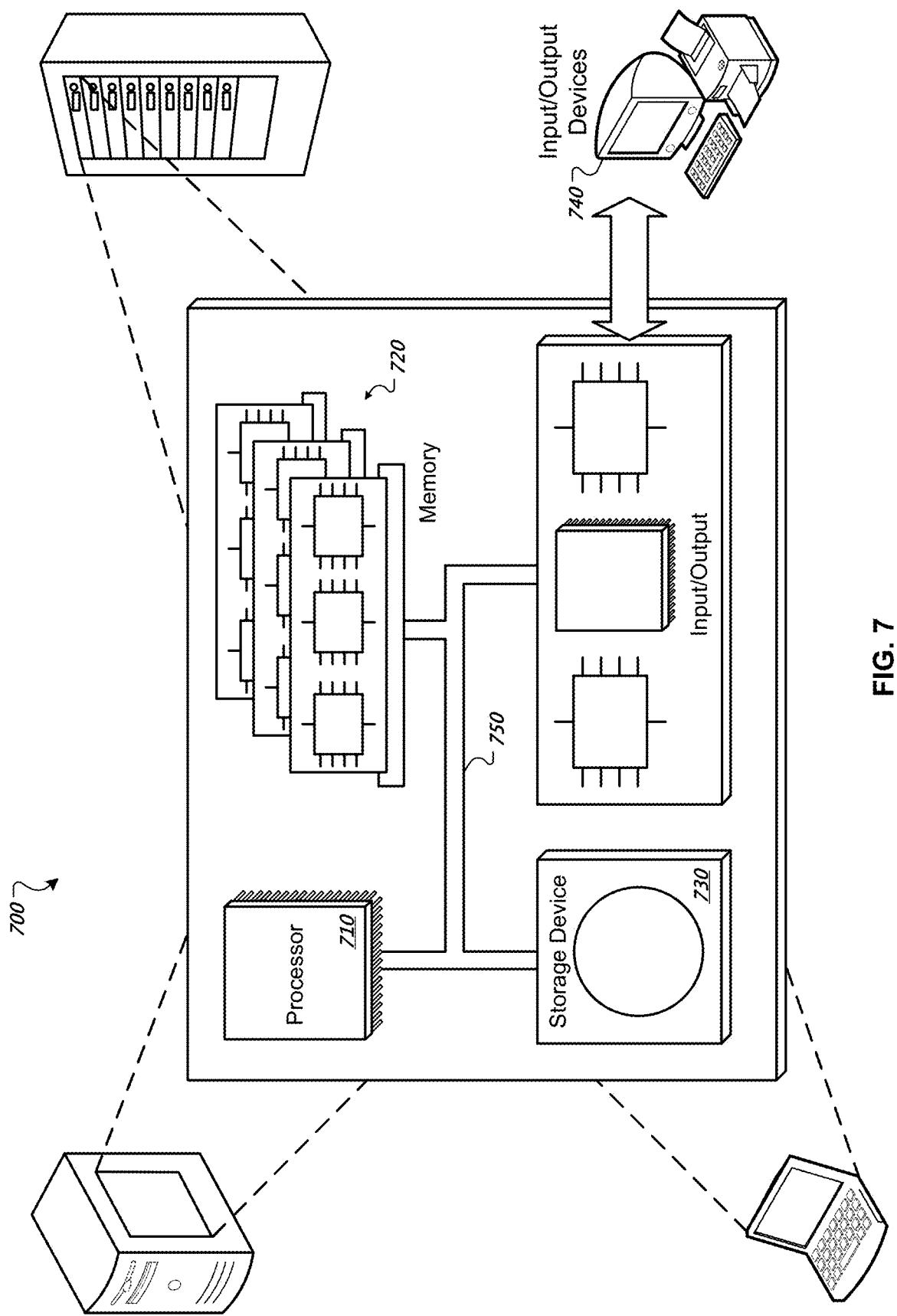
FIG. 7 is a block diagram of an example computer system that can be used to perform operations described.

FIG. 7 is block diagram of an example computer system 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In some implementations, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In some implementations, the memory 720 is a volatile memory unit. In another implementation, the memory 720 is a non-volatile memory unit.

The storage device 730 is capable of providing mass storage for the system 700. In some implementations, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In some implementations, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 760, e.g., keyboard, printer and display devices. Other implementations, however, can also be used, such as mobile computing devices, mobile communication devices, set-top box television client devices, etc.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
    identifying, for a video with which overlaid content is to be displayed, a video category of the video from a set of predefined video categories;
    for each video frame in a set of sampled video frames of the video:
        determining, for each video feature type of a set of video features types and for each location of multiple locations in the video frame, a confidence score that indicates a likelihood that the location in the video frame includes a feature of the video feature type;
        determining, based on the video category, a weight for each video feature type that reflects an importance of not occluding a video feature of the video feature type when a video of the video category is displayed; and
        adjusting, for each video feature type of the set of video features types, the confidence scores for the multiple locations in the video frame based on the determined weight for the video feature type, to generate adjusted confidence scores;
    aggregating the adjusted confidence scores for each location for each video frame in the set of sampled video frames to generate aggregated and adjusted confidence scores;
    determining, based on the aggregated and adjusted confidence scores, a location at which to position overlaid content during video display; and
    providing the overlaid content for display at the determined location in the video.

2. The computer-implemented method of claim 1, wherein the video feature types include human face, human torso, text, moving object, or change in color variance.

3. The computer-implemented method of claim 1, wherein at least some confidence scores for different video feature types are determined in parallel.

4. The computer-implemented method of claim 1, wherein adjusting, for each video feature type of the set of video features types, the confidence scores for the multiple locations in the video frame comprises adjusting the confidence scores for locations in the video frame that are within a predefined proximity of a center of the video frame.

5. The computer-implemented method of claim 1, wherein determining, based on the aggregated and adjusted confidence scores, the location at which to position overlaid content during video display further comprises determining the location at which to position overlaid content during video display based on a specified size of the overlaid content and a duration or number of frames over which the overlaid content is to be provided within the video.

6. The computer-implemented method of claim 1, wherein determining the location at which to position overlaid content comprises determining a plurality of locations and providing the overlaid content at the determined location comprises providing the overlaid content for display at one of the plurality of locations.

7. The computer-implemented method of claim 1, further comprising sampling, by a video processing system and based on a sampling rate, the video to obtain the set of sampled video frames, wherein the sampling rate is determined based on a processing capability of the video processing system.

8. A system, comprising:
one or more memory devices storing instructions; and
one or more data processing apparatus that are configured to interact with the one or more memory devices, and upon execution of the instructions, perform operations including:
identifying, for a video with which overlaid content is to be displayed, a video category of the video from a set of predefined video categories;
for each video frame in a set of sampled video frames of the video:
determining, for each video feature type of a set of video features types and for each location of multiple locations in the video frame, a confidence score that indicates a likelihood that the location in the video frame includes a feature of the video feature type;
determining, based on the video category, a weight for each video feature type that reflects an importance of not occluding a video feature of the video feature type when a video of the video category is displayed; and
adjusting, for each video feature type of the set of video features types, the confidence scores for the multiple locations in the video frame based on the determined weight for the video feature type, to generate adjusted confidence scores;
aggregating the adjusted confidence scores for each location for each video frame in the set of sampled video frames to generate aggregated and adjusted confidence scores;
determining, based on the aggregated and adjusted confidence scores, a location at which to position overlaid content during video display; and
providing the overlaid content for display at the determined location in the video.

9. The system of claim 8, wherein the video feature types include human face, human torso, text, moving object, or change in color variance.

10. The system of claim 8, wherein at least some confidence scores for different video feature types are determined in parallel.

11. The system of claim 8, wherein adjusting, for each video feature type of the set of video features types, the confidence scores for the multiple locations in the video frame comprises adjusting the confidence scores for locations in the video frame that are within a predefined proximity of a center of the video frame.

12. The system of claim 8, wherein determining, based on the aggregated and adjusted confidence scores, the location at which to position overlaid content during video display further comprises determining the location at which to position overlaid content during video display based on a specified size of the overlaid content and a duration or number of frames over which the overlaid content is to be provided within the video.

13. The system of claim 8, wherein determining the location at which to position overlaid content comprises determining a plurality of locations and providing the overlaid content at the determined location comprises providing the overlaid content for display at one of the plurality of locations.

14. The system of claim 8, wherein the operations further comprise sampling, by a video processing system and based on a sampling rate, the video to obtain the set of sampled video frames, wherein the sampling rate is determined based on a processing capability of the video processing system.

15. A non-transitory computer readable medium storing instructions that, when executed by one or more data processing apparatus, cause the one or more data processing apparatus to perform operations comprising:
identifying, for a video with which overlaid content is to be displayed, a video category of the video from a set of predefined video categories;
for each video frame in a set of sampled video frames of the video:
determining, for each video feature type of a set of video features types and for each location of multiple locations in the video frame, a confidence score that indicates a likelihood that the location in the video frame includes a feature of the video feature type;
determining, based on the video category, a weight for each video feature type that reflects an importance of not occluding a video feature of the video feature type when a video of the video category is displayed; and
adjusting, for each video feature type of the set of video features types, the confidence scores for the multiple locations in the video frame based on the determined weight for the video feature type, to generate adjusted confidence scores;
aggregating the adjusted confidence scores for each location for each video frame in the set of sampled video frames to generate aggregated and adjusted confidence scores;
determining, based on the aggregated and adjusted confidence scores, a location at which to position overlaid content during video display; and
providing the overlaid content for display at the determined location in the video.

16. The non-transitory computer readable medium of claim 15, wherein the video feature types include human face, human torso, text, moving object, or change in color variance.

17. The non-transitory computer readable medium of claim 15, wherein at least some confidence scores for different video feature types are determined in parallel.

18. The non-transitory computer readable medium of claim 15, wherein adjusting, for each video feature type of the set of video features types, the confidence scores for the multiple locations in the video frame comprises adjusting the confidence scores for locations in the video frame that are within a predefined proximity of a center of the video frame.

19. The non-transitory computer readable medium of claim 15, wherein determining, based on the aggregated and adjusted confidence scores, the location at which to position overlaid content during video display further comprises determining the location at which to position overlaid content during video display based on a specified size of the overlaid content and a duration or number of frames over which the overlaid content is to be provided within the video.

20. The non-transitory computer readable medium of claim 15, wherein determining the location at which to position overlaid content comprises determining a plurality of locations and providing the overlaid content at the determined location comprises providing the overlaid content for display at one of the plurality of locations.

* * * * *